(12) United States Patent
Murphy

(10) Patent No.: US 6,253,261 B1
(45) Date of Patent: Jun. 26, 2001

(54) SYSTEM AND METHOD FOR DIRECT MEMORY ACCESS IN A COMPUTER SYSTEM

(75) Inventor: Nicholas J. N. Murphy, Guildford (GB)

(73) Assignee: 3Dlabs Inc., Ltd., Hamilton (BM)

( * ) Notice: Subject to any disclaimer, the term of this patent is extended or adjusted under 35 U.S.C. 154(b) by 0 days.

(21) Appl. No.: 09/176,594

(22) Filed: Oct. 21, 1998

(51) Int. Cl.[7] .................................................. G06F 13/28
(52) U.S. Cl. ................................................. 710/22; 710/34
(58) Field of Search ........................ 710/22, 32, 33–35, 710/52; 711/110; 345/419, 425, 520, 521, 511

(56) References Cited

U.S. PATENT DOCUMENTS

| 5,581,790 | * | 12/1996 | Sefidvash ............................... 710/34 |
| 5,623,670 | * | 4/1997 | Bohannon et al. .................... 710/200 |
| 5,793,776 | * | 8/1998 | Qureshi et al. ....................... 714/724 |
| 5,864,716 | * | 1/1999 | Wishneusky ........................... 710/68 |
| 5,974,479 | * | 10/1999 | Satoh ...................................... 710/25 |

OTHER PUBLICATIONS

"ISA System Architecture," 3d ed., Chapter 19, MindShare, Inc., Tom Shanley, Don Anderson, 1995.
"Direct Memory Access", ISA System Architecture, 3rd Edition, 1995, Mindshare, Inc, Tom Shanley/Don Anderson, Chapter 19, p 409–432.

* cited by examiner

Primary Examiner—Thomas Lee
Assistant Examiner—Thuan Du
(74) Attorney, Agent, or Firm—Groover & Associates; Robert Groover; Betty Formby

(57) ABSTRACT

A system and method for improving the efficiency of DMA transfers. In particular, a "continue" command is provided for DMA block transfers. In practice, this command allows the system to begin a DMA transfer before the entire size of the transfer block is known and to continue the transfer, avoiding an additional setup time, by simply instructing the DMAC to continue sending data in the same manner. Transfer continuation is accomplished by resetting the DMA transfer count register to a new value without ever stopping the transfer. Each time the transfer count runs down, the system resets it to a higher value and continues the transfer rather than initializing a second transfer.

21 Claims, 3 Drawing Sheets

SYSTEM AND METHOD FOR DIRECT MEMORY ACCESS IN A COMPUTER SYSTEM

BACKGROUND AND SUMMARY OF THE INVENTION

The present application relates to bus interfaces to computer systems, and particularly to interfaces to graphics rendering hardware.

BACKGROUND
Computer Graphics and Rendering

Modern computer systems normally manipulate graphical objects as high-level entities. For example, a solid body may be described as a collection of triangles with specified vertices, or a straight line segment may be described by listing its two endpoints with three-dimensional or two-dimensional coordinates. Such high-level descriptions are a necessary basis for high-level geometric manipulations. These descriptions also have the advantage of providing a compact format which does not consume memory space unnecessarily.

Such higher-level representations are very convenient for performing the many required computations. For example, ray-tracing or other lighting calculations may be performed and a projective transformation can be used to reduce a three-dimensional scene to its two-dimensional appearance from a given viewpoint. However, when an image containing graphical objects is to be displayed, a very low-level description is needed. For example, in a conventional CRT display, a "flying spot" is moved across the screen (one line at a time), and the beam from each of three electron guns is switched to a desired level of intensity as the flying spot passes each pixel location. Thus, at some point the image model must be translated into a data set which can be used by a conventional display. This operation is known as "rendering."

A graphics-processing system typically interfaces to the display controller through a "frame store" or "frame buffer" of special two-port memory. The frame store can be written to randomly by the graphics processing system, and also provides the synchronous data output needed by the video output driver. (Digital-to-analog conversion is also provided after the frame buffer.) This interface relieves the graphics-processing system of most of the burden of synchronization for video output. Nevertheless, the amounts of data which must be moved around are very sizable and the computational and data-transfer burden of placing the correct data into the frame buffer can still be very large.

Even if the computational operations required are quite simple, they must be performed repeatedly on a large number of data-points. If blending is desired, additional bits (e.g., another 8 bits per pixel) will be required to store an "alpha" (or "transparency value") for each pixel. This calculation implies manipulation of more than 3 billion bits per second without allowing for any of the actual computations being performed. Thus, it may be seen that this environment has unique data manipulation requirements.

If the display is unchanging, no demand is placed on the rendering operations. However, some common operations (such as zooming or rotation) will require every object in the image space to be re-rendered. Slow rendering will make the rotation or zoom appear jerky. This effect is highly undesirable. Thus, efficient rendering is an essential step in translating an image representation into the correct pixel values. Need for efficient rendering is particularly acute in animation applications where newly rendered updates to a computer graphics display must be generated at regular intervals.

The rendering requirements of three-dimensional graphics are particularly heavy. One reason for such heavy requirements is that even after the three-dimensional model has been translated to a two-dimensional model some computational tasks may be bequeathed to the rendering process. (For example, color values will need to be interpolated across a triangle or other primitive.) These computational tasks tend to burden the rendering process. Another reason is that since three-dimensional graphics are much more lifelike, users are more likely to demand a fully rendered image. (By contrast, in the two-dimensional images created e.g. by a GUI or simple game, users will learn not to expect all areas of the scene to be active or filled with information.)

There are several other processes performed in a 3D graphics computer system. A three dimensional image which is defined in some fixed 3D coordinate system (a "world" coordinate system) is transformed into a viewing volume (determined by a view position and direction), and the parts of the image which fall outside the viewing volume are discarded. The visible portion of the image volume is then projected onto a viewing plane, in accordance with the familiar rules of perspective. This produces a two-dimensional image, which is now mapped into device coordinates. It is important to understand that all of these operations occur prior to the operations performed by the rendering subsystem of the present invention.

A vast amount of engineering effort has been invested in computer graphics systems, and this area is one of increasing activity and demands. Numerous books have discussed the requirements of this area; see, e.g., ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, How COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed. 1994); Scott Whitman, MULTIPROCESSOR METHODS FOR COMPUTER GRAPHICS RENDERING; the SIGGRAPH PROCEEDINGS for the years 1980–1998; and the *IEEE Computer Graphics and Applications* magazine for the years 1990–1998; all of which are hereby incorporated by reference.

Direct Memory Access (DMA)

An old feature of computer architecture is direct memory access ("DMA"), where a set of data is transferred into a set of memory locations, under the control of a DMA controller, without requiring active intervention by the host computer.

DMA controllers normally transfer data from one contiguous range of addresses to another contiguous range of addresses. The source or destination can sometimes be a single address (such as might represent an I/O port). In an advanced rendering subsystem this is unsuitable because the registers are not contiguous in the address map, and never can be, due to the different subsets needed for the various types of rendering performed. Having to provide address/ data pairs to the DMA controller halves the available DMA bandwidth and places more burden on the host in making up the DMA buffers in the first place. This is unlike the case of a host writing data directly to the control registers (even if a FIFO is hidden in the path), where arbitrary addressing is handled with no additional cost in memory bandwidth (since the address does not travel on the data bus, but on its own bus).

Direct Memory Access in ISA Systems

In an ISA (Industry Standard Architecture) computer system, typical transfers of data between the memory and any I/O or peripheral device are handled by the CPU. For each such transfer, the data, under CPU direction, is copied twice: e.g., from the device to the CPU, then from the CPU to the memory. In applications which are computationally intensive, these simple data transfers can slow down operations significantly by creating a bandwidth bottleneck at the CPU. It is therefore advantageous to utilize a system for data transfer which does not require the CPU to actively manage each such data transfer.

Direct Memory Access (DMA) is a system which allows data transfers to be initiated by the CPU, and thereafter managed by the DMA controller (DMAC). In this manner, the CPU is freed up to perform other duties. Once the CPU has initiated the block data transfer, the DMAC and I/O device complete the transfer without disturbing the CPU again. The DMAC used in ISA machines is able to perform both read and write block DMA transfers in a single DMA cycle without latching the data internally, instead of the two separate bus cycles (a read followed by a write) normally required by the microprocessor. FIG. 3 shows a block diagram of a typical ISA computer system and the typical placement and connections of the DMA controller.

When the transfer has been completed, the I/O device will send an interrupt to the CPU to indicate that the transfer is done. At this time, the CPU will stop its current processing and perform a read operation from the I/O device to ensure that the transfer is complete. If the I/O device reports no errors, the CPU resumes processing where it left off.

DMA Transfer Modes and Types

In conventional systems, there are three types of DMA transfers. The first of these is a read transfer; in a read transfer, data is read from memory and written to the I/O device associated with a particular DMA channel. In a write transfer, data is read from an I/O device, over a DMA channel and written to memory. The final type of transfer is the "verify" transfer, in which the DMAC generates memory addresses and executes the DMA transfer bus cycles, but neither the read or write lines are ever asserted; this type of transfer was used for DRAM memory refresh in legacy systems.

In conventional systems, there are four DMA transfer modes. These are:

Single Transfer Mode
Block Transfer Mode
Demand Transfer Mode
Cascade Mode

In single transfer mode, the DMAC share the system buses (on a time-share basis) with the CPU. The DMAC yields the buses to the CPU after each byte or word is transferred so the CPU can have regular access to the buses. If this were not done, system stability and throughput would suffer when the CPU and refresh logic are isolated from memory for too long during large data transfers.

Block transfer mode is used when the DMAC needs to transfer a block of data. In this mode, the executing application (through the CPU) needs to set up the DMAC registers to indicate the type of transfer, the start memory address, and the number of DMA cycles to run (the Transfer Count). After this is done, the CPU programs the I/O device to initiate the block transfer. Thereafter, the entire transfer is handled by the I/O device and the DMAC, as described above.

In demand transfer mode, the DMAC runs sequential DMA bus cycles as long as the I/O device is able to keep up and keeps the DRQ(n) line asserted. When the I/O device deasserts its DRQ(n) line, the DMAC is temporarily suspended. This continues until the DMA transfer count is exhausted.

When the DMAC operates in cascade mode, it is connected to either another DMAC or to and ISA bus master, rather than to an I/O device. This is done to increase the number of DMA channels available to the system.

Additional information regarding Direct Memory Access may be found in the PC System Architecture Series by Mindshare, Inc., and in particular in *ISA System Architecture, Third Edition*, by Shanley & Anderson, all of which are hereby incorporated by reference.

Inefficiency in Current DMA Systems

The traditional method of initiating a DMA is to load the starting address into a register and a count of the amount of data to transfer into another register. The transfer then begins and runs until the count decrements to zero. A problem associated with this scheme is balancing latency against efficiency. It is important to use a large number of small DMA transfers in order to keep the I/O device, e.g., a graphics chip, busy. If a large transfer is used the I/O device may be idle during the time the DMA buffer is built and there may a significant delay between the CPU issuing a command and it being executed by the I/O device. Starting each DMA, however, incurs the cost of first waiting for the current DMA to complete then loading the registers and starting the next DMA. It is also generally true that the bus protocols used to transfer the data tend to favor long transfers.

Improved System and Method for Direct Memory Access in a Computer System

This application provides an innovative system and method for improving the efficiency of DMA transfers. In particular, the preferred embodiment provides a "continue" command for DMA block transfers. In practice, this allows the system to begin a DMA transfer before the entire size of the transfer block is known. The transfer is then continued, avoiding an additional setup time, by simply instructing the DMAC to continue sending data in the same manner. This continuous transfer is accomplished by resetting the DMA transfer count register to a new value without ever stopping the transfer. Each time the transfer count runs down, the system merely resets it to a higher value and continues the transfer rather than initializing a second transfer.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation), in which:

This preferred embodiment allows both objectives of low latency and long transfers to be met. To begin a DMA transfer, the start address and count are loaded as before. The DMA can be extended by sending a continue command which instructs the DMA to extend the count by some amount. Any number of continue commands can be sent and each one can be incorporated into the current DMA. Because there is no need to wait for the current DMA to complete, it takes very little time to process a continue command. Additionally because small DMAs are combined into a single big DMA, the long transfers favored by the bus protocol can be generated.

Each continue command that is sent can be accepted immediately by simply adding the count amount to continue by to the current count value. The graphics chip does not have to maintain a queue of continue commands. The last address read from by the DMA can be read back by the CPU.

An example of DMA use is the circular command buffer. This buffer is a contiguous section of memory used to hold commands for the graphics chip. The objective is to allow the CPU to write commands to the buffer as needed while the graphics chip reads command when it needs more work to do. When the CPU reaches the end of the buffer, it returns to the stat of the buffer and begins filling it again. Care must be taken that it does not overwrite data that the graphics chip has not yet read. Without the continue command, it is necessary to batch up a significant number of commands before starting a DMA in order to amortize the start-up costs of a DMA. With a continue command, the CPU can effectively issue very small DMA buffers to the graphics chip without the start-up cost. This improves the responsiveness of the system.

The innovative DMA system is used, in the preferred embodiment, as the DMA interface for the PERMEDIA 3 graphics processor. The PERMEDIA 3 processor is manufactured by 3Dlabs, Inc., Ltd., and further details of the system context may be obtained from 3Dlabs directly. Of course, this innovative DMA system will provide advantages to any high-throughput device used in conjunction with a computer system.

The DMA Interface

Figure 1:
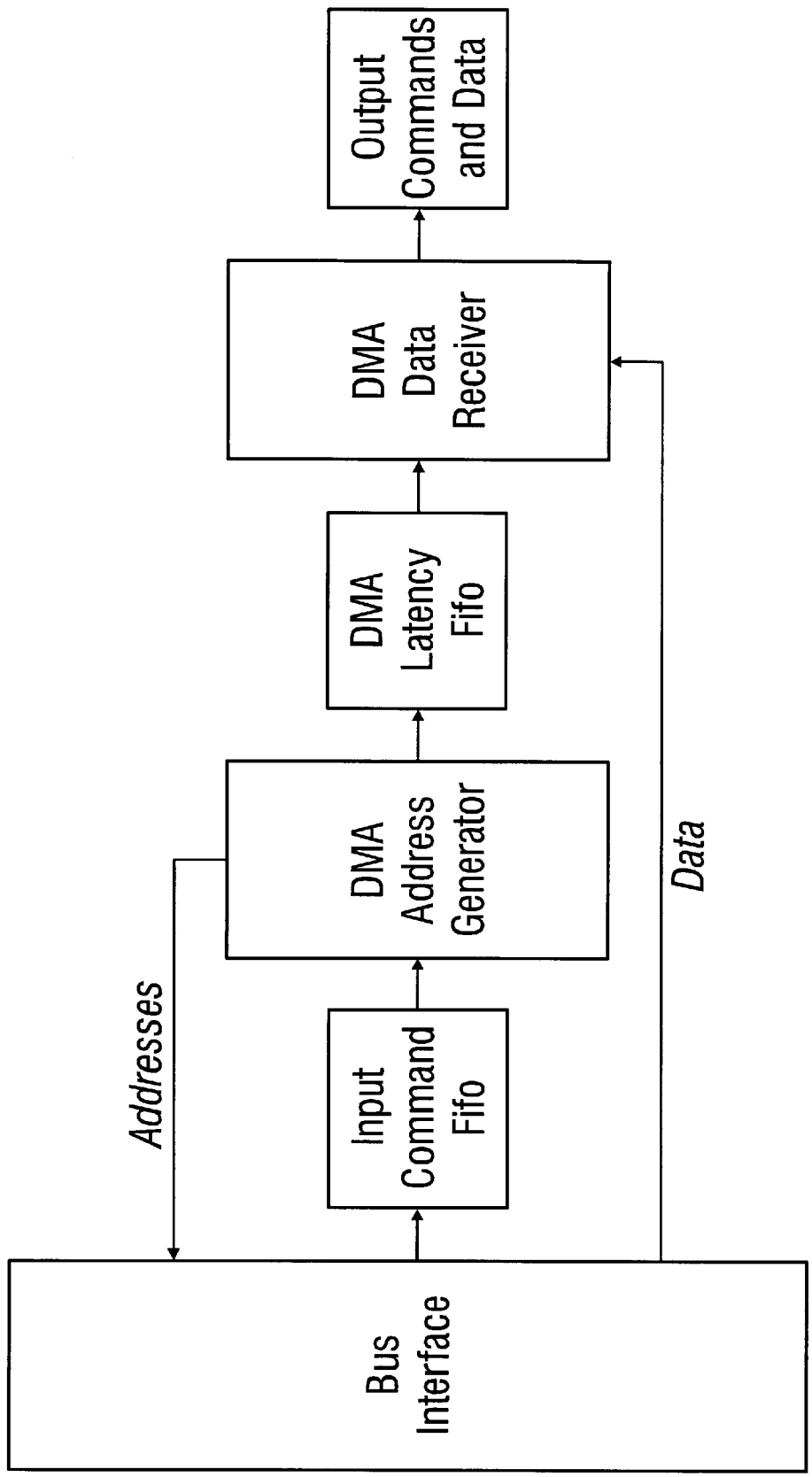
FIG. 1 shows a block diagram of the DMA interface of the preferred embodiment.

FIG. 1 shows a block diagram of the innovative DMA interface of the preferred embodiment. According to this diagram, the host interface (which communicates with the host CPU, not shown) receives memory addresses from the DMA address generator, and passes data from the memory to the DMA data receiver. Commands are passed from the host interface to the address generator and on to the DMA data receiver. The DMA data receiver communicates with the PERMEDIA 3 (or other system device), passing data and commands to it, and receiving memory requests from it. FIFOs are included at the input to the address generator and the data generator to buffer the data passing through the DMA system.

Note that if two buffers are being used a new address has to be loaded to move between buffers. Conventional systems require the outstanding DMA to complete before the new address is loaded. One particular advantage of the preferred embodiment is that it allows a new address to be loaded before the current DMA finishes. Any DMAContinue commands issued after the new address apply to the new buffer. When the current DMA completes, it starts on the new address immediately.

Loading registers directly via the FIFO is often an inefficient way to download data to PERMEDIA 3. Given that the FIFO can accommodate only a small number of entries, PERMEDIA 3 has to be frequently interrogated to determine how much space is left. Also, consider the situation where a given API function requires a large amount of data to be sent to PERMEDIA 3. If the FIFO is written directly then a return from this function is not possible until almost all the data has been consumed by PERMEDIA 3. The return time depends, in part, on the types of primitives being drawn by the graphics processor and the throughput of any other type of device which is utilizing the preferred DMA interface.

To avoid these problems the PERMEDIA 3 provides an on-chip DMA controller which can be used to load data from arbitrary sized (<64K 32-bit words) host buffers into the FIFO. In its simplest form the host software has to prepare a host buffer containing register address tag descriptions and data values. It then writes the base address of this buffer to the DMAAddress register and the count of the number of words to transfer to the DMACount register. Writing to the DMACount register starts the DMA transfer and the host can now perform other work. In general, if the complete set of rendering commands required by a given call to a driver function can be loaded into a single DMA buffer then the driver function can return. Meanwhile, in parallel, PERMEDIA 3 is reading data from the host buffer and loading it into its FIFO. FIFO overflow never occurs since the DMA controller automatically waits until there is room in the FIFO before doing any transfers.

The only restriction on the use of DMA control registers is that before attempting to reload the DMACount register the host software must wait until any previous DMA has completed. It is valid to load the DMAAddress register while the previous DMA is in progress since the address is latched internally at the start of the DMA transfer.

Using DMA leaves the host free to return to the application, while in parallel, PERMEDIA 3 is performing the DMA and drawing. Use of DMA can increase performance significantly over loading a FIFO directly. In addition, some algorithms require that data be loaded multiple times (e.g. drawing the same object across multiple clipping rectangles). Since the PERMEDIA 3 DMA only reads the buffer data, it can be downloaded many times simply by restarting the DMA. This restart capability can be very beneficial if composing the buffer data is a time consuming task.

The host can use this hardware capability in various ways. For example, a further optional optimization is to use a double buffered mechanism with two DMA buffers. This allows the second buffer to be filled before waiting for the previous DMA to complete, thus further improving the parallelism between host and PERMEDIA 3 processing. Thus, this optimization is dependent on the allocation of the host memory. If there is only one DMA host buffer then either it is being filled or it is being emptied—it cannot be filled and emptied at the same time since there is no way for the host and DMA to interact once the DMA transfer has started. The host is at liberty to allocate as many DMA buffers as it wants. To accomplish double buffering at least two buffers are required. Allocating many small buffers is generally better as it gives the benefits of double buffering together with low latency time. Therefore, the PERMEDIA 3 is not idle while large buffer is being filled up. However, use of many small buffers is of course more complicated.

In general the DMA buffer format consists of a 32-bit address tag description word followed by one or more data words. The DMA buffer consists of one or more sets of these formats. The following paragraphs describe the different types of tag description words that can be used.

DMA Tag Description Format

There are 3 different tag addressing modes for DMA: hold, increment and indexed. The different DMA modes are provided to reduce the amount of data which needs to be transferred, hence making better use of the available DMA bandwidth. Each of these is described in the following sections.

Hold Format

In this format, the 32-bit tag description contains a tag value and a count specifying the number of data words following in the buffer. The DMA controller writes each of the data words to the same address tag. For example, this is useful for image download where pixel data is continuously written to the Color register. The bottom 9 bits specify the register to which the data should be written; the high-order 16 bits specify the number of data words (minus 1) which follow in the buffer and which should be written to the address tag (note that the 2-bit mode field for this format is zero so a given tag value can simply be loaded into the low order 16 bits).

A special case of this format is where the top 16 bits are zero indicating that a single data value follows the tag (i.e. the 32-bit tag description is simply the address tag value itself). This allows simple DMA buffers to be constructed which consist of tag/data pairs.

Increment Format

This format is similar to the hold format except that as each data value is loaded the address tag is incremented (the value in the DMA buffer is not changed; PERMEDIA 3 updates an internal copy). Thus, this mode allows contiguous PERMEDIA 3 registers to be loaded by specifying a single 32-bit tag value followed by a data word for each register. The low-order 9 bits specify the address tag of the first register to be loaded. The 2 bit mode field is set to 1 and the high-order 16 bits are set to the count (minus 1) of the number of registers to update. To enable use of this format, the PERMEDIA 3 register file has been organized so that registers which are frequently loaded together have adjacent address tags. For example, the 32 AreaStipplePattern registers can be loaded as follows:

AreaStipplePattern0, Count=31, Mode=1
row 0 bits
row 1 bits
. . .
row 31 bits

Indexed Format

PERMEDIA 3 address tags are 11 bit values. For the purposes of the Indexed DMA Format they are organized into major groups and within each group there are up to 16 tags. The low-order 4 bits of a tag give its offset within the group. The high-order 7 bits give the major group number.

This format allows up to 16 registers within a group to be loaded while still only specifying a single address tag description word.

If the Mode of the address tag description word is set to indexed mode, then the high-order 16 bits are used as a mask to indicate which registers within the group are to be used. The bottom 4 bits of the address tag description word are unused. The group is specified by bits 4 to 10. Each bit in the mask is used to represent a unique tag within the group. If a bit is set then the corresponding register will be loaded. The number of bits set in the mask determines the number of data words that should be following the tag description word in the DMA buffer. The data is stored in order of increasing corresponding address tag.

DMA Buffer Addresses

Host software must generate the correct DMA buffer address for the PERMEDIA 3 DMA controller. Normally, the address passed to PERMEDIA 3 must be the physical address of the DMA buffer in host memory. The buffer must also reside at contiguous physical addresses as accessed by PERMEDIA 3. On a system which uses virtual memory for the address space of a task, some method of allocating contiguous physical memory, and mapping this into the address space of a task, must be used.

If the virtual memory buffer maps to non-contiguous physical memory, then the buffer must be divided into sets of contiguous physical memory pages and each of these sets transferred separately. In such a situation the whole DMA buffer cannot be transferred in one go; the host software must wait for each set to be transferred. Often the best way to handle these fragmented transfers is via an interrupt handler.

DMA Interrupts

In the preferred embodiment, a DMA interrupt command is provided to optionally indicate the end of a DMA transfer. If the interrupt command is the last command in the DMA buffer, and interrupt is sent to the CPU to indicate the end of the transfer.

Interrupts are also supported in an alternate embodiment as an alternative means of determining when a DMA transfer is complete. If enabled, the interrupt is generated whenever the DMACount register changes from having a non-zero to having a zero value. Since the DMACount register is decremented every time a data item is transferred from the DMA buffer an interrupt is generated when the last data item is transferred from the DMA buffer.

To enable the DMA interrupt, the DMAInterruptEnable bit must be set in the IntEnable register. The interrupt handler should check the DMAFlag bit in the IntFlags register to determine that a DMA interrupt has actually occurred. To clear the interrupt a word should be written to the IntFlags register with the DMAFlag bit set to one.

This scheme frees the processor for other work while DMA is being completed. Since the overhead of handling an interrupt is often quite high for the host processor, the scheme should be tuned to allow a period of polling before sleeping on the interrupt.

Figure 2:
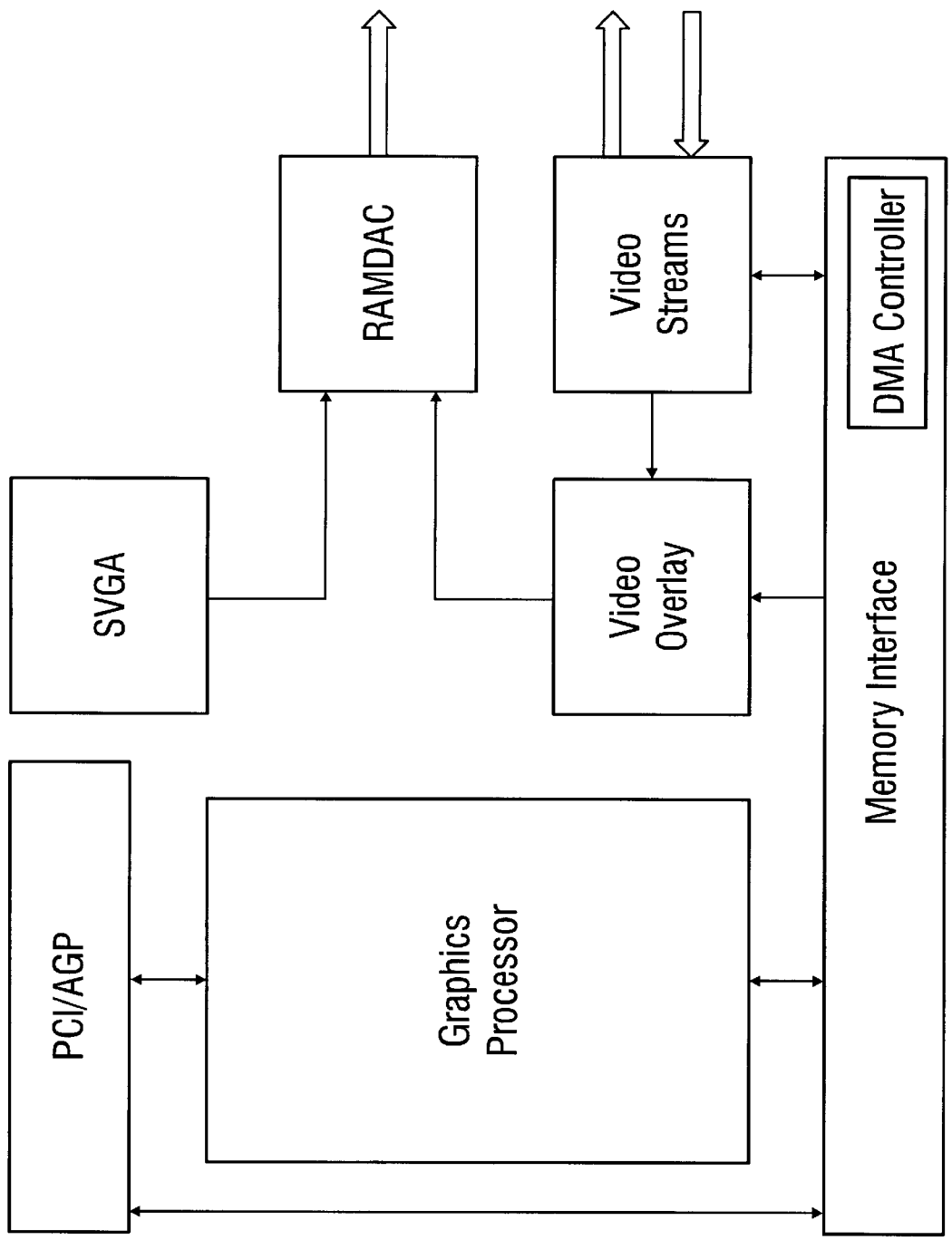
FIG. 2 shows a block diagram of a graphics processor incorporating a DMA system according to the preferred embodiment.
Figure 3:
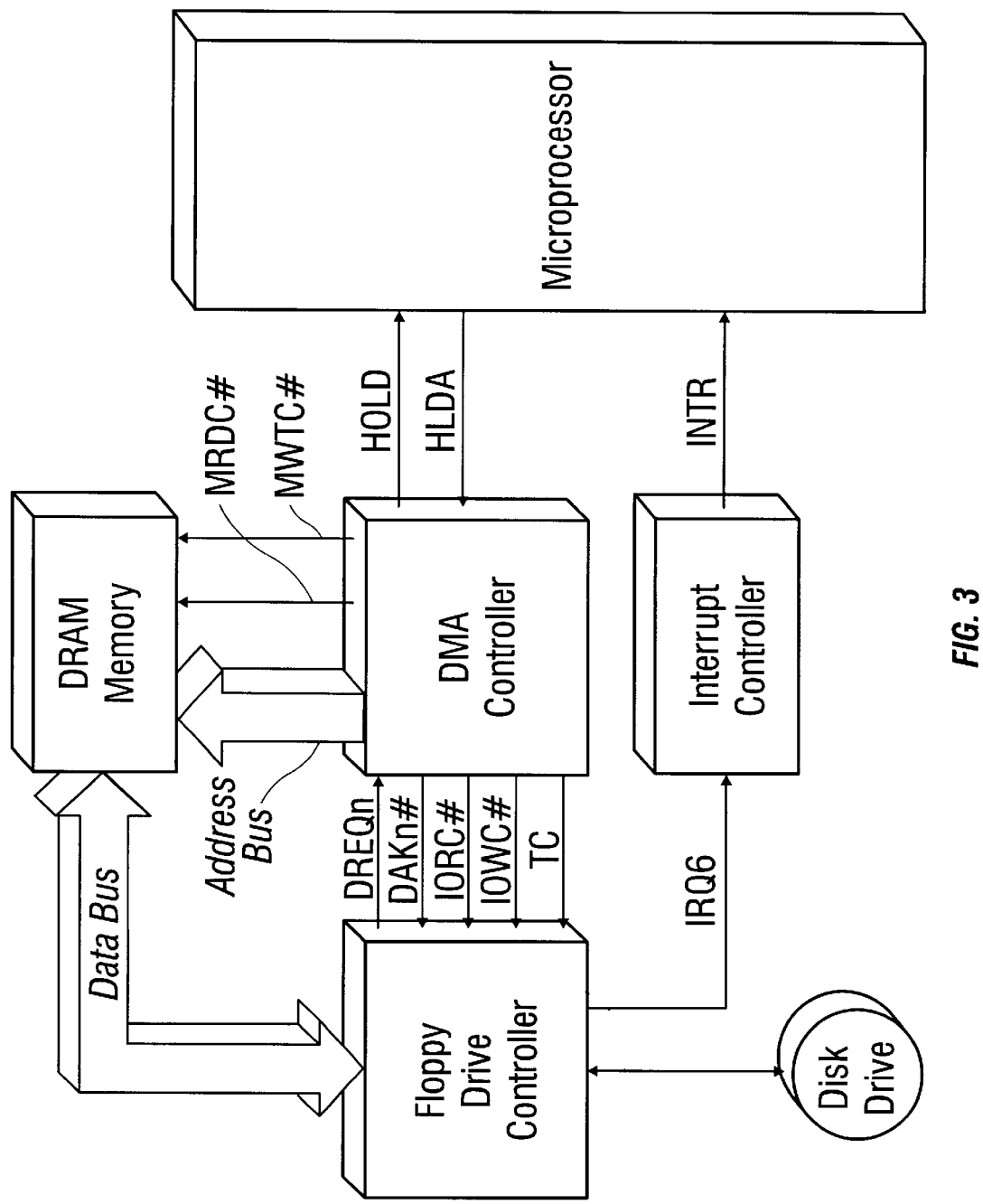
FIG. 3 shows a block diagram of a typical computer system incorporating Direct Memory Access.

FIG. 2 shows a block diagram of the PERMEDIA 3 graphics system, into which a DMA system according to the preferred embodiment is incorporated. In this diagram, the DMA controller is shown as part of the memory interface, which is connected to communicated with the PCI/AGP bus unit, the graphics processor itself, and the video overlay and video streams units. The PCI/AGP bus unit, of course, provides a connection to the host system, including the host CPU and the host memory.

According to one disclosed embodiment, there is provided a method for data transfer in a computer system, comprising the steps of: initializing a direct memory access controller to perform a data transfer, including entering a value into a count register; transferring data across a direct memory access channel between a memory and an input/output device; changing the value in said count register as said data is transferred; and stopping said transfer when said count register reaches a predetermined value; wherein if additional data is required from memory before said stopping step, then entering a new value in said count register and continuing said transferring step.

According to another disclosed embodiment, there is provided a computer system, comprising: a memory; a processor connected to access said memory across a primary bus; at least one peripheral device connected to be controlled by said processor and to pass data across said primary bus; a controller connected to be controlled by said processor to pass data between said memory and said device across a secondary bus; wherein said controller is configured to accept additional data transfer commands when a transfer is in progress; and wherein said controller is configured to continue and extend a current transfer if said additional transfer commands relate to a data block adjacent to said current transfer.

According to another disclosed embodiment, there is provided a computer system, comprising: a memory; a processor connected to access said memory across a primary bus; a graphics processor connected to be controlled by said processor and to pass data across said primary bus; a DMA controller connected to be controlled by said processor to pass data between said memory and said device across a DMA channel; wherein said DMA controller is configured to accept additional data transfer commands when a transfer is in progress; and wherein said DMA controller is configured to continue and extend a current transfer if said additional transfer commands relate to a data block adjacent to said current transfer.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the presently preferred embodiment is described in the context of an ISA computer system. However, the system and method described are not architecture specific and can be applied to other computer architectures such as PCI, EISA, etc.

For another example, the presently preferred embodiment is described in the context of the PERMEDIA 3 graphics processor. However, virtually any graphics processor can take advantage of the improved system and method for DMA described herein.

What is claimed is:

1. A method for data transfer in a computer system, comprising the steps of:

initializing a direct memory access controller to perform a data transfer, including entering a value into a count register;

transferring data across a direct memory access channel between a memory and an input/output device;

changing the value in said count register as said data is transferred; and stopping said transfer when said count register reaches a predetermined value;

wherein if additional data is required from memory before said stopping step, then entering a new value in said count register and continuing said transferring step.

2. The method of claim 1, wherein said input/output device is a graphics processor.

3. The method of claim 1, further comprising the step of loading a new memory address in said controller while said transfer is in progress, and continuing said transferring step from said new memory address when said transfer is complete.

4. The method of claim 1, wherein said continuing allows a continuous data transfer without a reinitialization of said controller.

5. The method of claim 1, wherein said changing step includes decrementing the value in said count register.

6. The method of claim 1, wherein said predetermined value is 0.

7. The method of claim 1, wherein said transfer may be continued multiple times.

8. A computer system, comprising:

a memory;

a processor connected to access said memory across a primary bus;

at least one peripheral device connected to be controlled by said processor and to pass data across said primary bus;

a controller connected to be controlled by said processor to pass data between said memory and said device across a secondary bus;

wherein said controller is configured to accept additional data transfer commands when a transfer is in progress; and wherein said controller is configured to continue and extend a current transfer if said additional transfer commands relate to a data block adjacent to said current transfer.

9. The system of claim 8, wherein said peripheral device is a graphics processor.

10. The system of claim 8, wherein said controller is also configured to receive a new memory address while said transfer is in progress, and to continue said transfer from said new memory address when said transfer is complete, regardless of whether said new memory address is contiguous to the current transfer.

11. The system of claim 8, wherein said continued transfer takes place without a reinitialization of said controller.

12. The system of claim 8, wherein said transfer is continued by changing the value in a decrementing count register.

13. The system of claim 8, wherein an interrupt is sent from said controller to said processor when said transfer is complete.

14. The system of claim 8, wherein said transfer may be continued multiple times.

15. A computer system, comprising:

a memory;

a processor connected to access said memory across a primary bus;

a graphics processor connected to be controlled by said processor and to pass data across said primary bus;

a DMA controller connected to be controlled by said processor to pass data between said memory and said device across a DMA channel;

wherein said DMA controller is configured to accept additional data transfer commands when a transfer is in progress; and wherein said DMA controller is configured to continue and extend a current transfer if said additional transfer commands relate to a data block adjacent to said current transfer.

16. The system of claim 15, wherein said graphics processor processes 3D graphics.

17. The system of claim 15, wherein said controller is also configured to receive a new memory address while said transfer is in progress, and to continue said transfer from said new memory address when said transfer is complete, regardless of whether said new memory address is contiguous to the current transfer.

18. The system of claim 15, wherein said continued transfer takes place without a reinitialization of said controller.

19. The system of claim 15, wherein said transfer is continued by changing the value in a decrementing count register.

20. The system of claim 15, wherein an interrupt is sent from said controller to said processor when said transfer is complete.

21. The system of claim 15, wherein said transfer may be continued multiple times.

* * * * *